3,565,570
20 TO 50% AQUEOUS CONCENTRATE OF TRIMETHYL QUATERNARY AMMONIUM METHYLENE COPPER PHTHALOCYANINE

Chi K. Dien, Buffalo, N.Y., assignor to Allied Chemical Corporation, New York, N.Y., a corporation of New York
No Drawing. Filed Mar. 22, 1968, Ser. No. 715,189
Int. Cl. C09b 67/00; D21h 1/46
U.S. Cl. 8—7                                              10 Claims

ABSTRACT OF THE DISCLOSURE

Concentrated, fluid, aqueous solutions of trimethyl ammonium salts of polymethylene copper phthalocyanine of particular utility in the dyeing of paper and characterized by a high degree of water solubility and suitable viscosity properties.

---

Most paper is colored, at least to some extent by the addition of a dye which is generally added to an aqueous slurry of the pulp, for example in the beater, during the manufacture of the paper. It is known that cellulosic materials, such as paper, can be dyed with phthalocyanine dyestuffs containing quaternary ammonium, tertiary sulfonium or isothiuronium groups by applying the dyestuff in the manner mentioned above. However, due to low solubility of the dyestuffs in water or the viscosity of their aqueous solutions, concentrated forms of these dyestuffs have not been successfully utilized. The use of concentrated aqueous solutions is particularly advantageous in view of the increasing trend toward automation, since such solutions can be conveniently handled and added to the pulp slurry in accurately measured amounts by usual liquid pumping and metering means. Concentrated, fluid, aqueous solutions offer a further advantage of convenience in shipping and handling since the problem of dusting, commonly encountered with powdered dyes, is eliminated. In addition, a greater degree of solubility will permit shipping and handling of solutions of higher solute (i.e. dye) concentrations with a resultant saving from decrease in weight and volume of solution per part of dye.

It has now been found that the foregoing advantages are provided, in accordance with the present invention, by concentrated, fluid, aqueous solutions of the trimethyl ammonium salts of polymethylene copper phthalocyanine characterized by the formula:

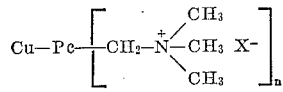

where $n$ is 2 to 8, Pc is phthalocyanine, and X is an anion selected from the group consisting of chloride, bromide, methylsulfate.

I have found that dyestuffs of the type described are well suited to the dyeing of paper and impart an attractive turquoise shade to the paper. Moreover, these dyestuffs have been found to possess a surprisingly high degree of water-solubility and the solutions have desirable viscosity characteristics. Thus they are well adapted to the formulation of highly concentrated aqueous solutions suitable for use with ordinary liquid handling means. Thus, in accordance with the present invention, there is provided a concentrated aqueous solution containing between about 20 and 60 percent by weight and preferably between about 30 and 50 percent by weight of a dyestuff characterized by the formula shown above.

The solubility and viscosity characteristics of the trimethyl ammonium salts of polymethylene copper phthalocyanine are unique and surprising since other closely related dyestuffs of the same series are unsuitable for use in concentrated aqueous solutions because of their low solubility in water or the high viscosity of their aqueous solutions. For example, the corresponding triethyl ammonium salts and pyridyl salts are not only poor in water-solubility, but form extremely viscous solutions which are difficult to handle, i.e. to pump, pour, meter, etc. by the usual methods of liquid handling. In contrast, the concentrated aqueous solutions of the present invention containing between about 20 and 60 percent by weight of dissolved dyestuff, are characterized by a water-like fluidity, the viscosity being generally below about 100 centipoises at 25 degrees centigrade.

The trimethyl ammonium salts of the present invention are prepared by reaction of chloromethylated or bromomethylated copper phthalocyanine with trimethylamine. The preparation of chloro and bromomethylated copper phthalocyanine is known and is disclosed, for example, in U.S. Pat. 2,435,307. The resulting ammonium salt may be further reacted to substitute the desired anion, such as methyl sulfate, as will be recognized by those skilled in the art. The preparation of the trimethyl ammonium salt is conveniently carried out in an aqueous rather than an organic medium. In this manner the reaction medium forms the solvent for the desired concentrated aqueous solution and the need for separating the dyestuff from the reaction medium (as would be necessary with an organic solvent) is eliminated. It is recommended that agitation be provided during the reaction since the chloromethylated or bromomethylated copper phthalocyanine is substantially insoluble in water. As the reaction proceeds the reaction product will dissolve in the aqueous medium. By appropriate selection of the ratio of water to reactants the reaction product can be prepared directly in the desired aqueous concentration without the necessity of further concentration.

The following specific examples will serve to further illustrate the invention and the manner in which it may be practiced. In the examples, unless otherwise indicated, all parts and percentages are by weight and all temperatures are in degrees centigrade.

EXAMPLE 1

To 370 parts of water were added 350 parts of a 25 percent aqueous solution of trimethylamine and 280 parts of a mixed tris, tetrakis-chloromethyl copper phthalocyanine (Cl=15.4 percent). One hundred and fifty parts of sand was added and the entire reaction mixture was thoroughly mixed by rolling in a cylindrical container for a period of about 16 hours. During the mixing the chloromethylcopper phthalocyanine gradually reacted with the trimethylamine.

The reaction product

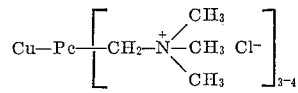

was a dark blue solution of high fluidity containing approximately 35 percent of dissolved copper phthalocyanine tris, tetrakis (methylene trimethyl ammonium chloride). The viscosity of the solution (after removal of the sand by filtration) was 10 centipoises at 25 degrees. After storage at 60 degrees for 14 days and at −10 to −15 degrees for 14 days the solution exhibited no deterioration of viscosity characteristics.

EXAMPLE 2

A portion of the concentrated aqueous solution, prepared in accordance with Example 1, was diluted with water to a strength of 0.2 percent by weight of the dyestuff. Ten parts of the dilute solution was added to 250 parts of bleached sulfite pulp (i.e. 3 parts of dry pulp in 250 parts of water) in a pulp beater. Because of its high water solubility, the dyestuff dissolved and mixed rapidly in the slurry. Next, 2 parts of 3 percent papermaker's rosin (PEXOL) and 3 parts of 10 percent aqueous solution of alum were added. The slurry was mixed in the beater, screened, pressed and dried in the usual manner. The paper was colored a bright turquoise and exhibited excellent light-fastness, bleachability and resistance to water-bleeding.

EXAMPLE 3

An aqueous solution of the dye having the formula below was prepared as follows:

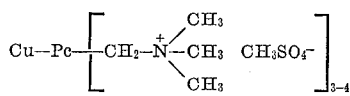

To a smooth paste-like mixture of 140 parts of mixed tris- and tetrakis-chloromethyl copper phthalocyanines and 720 parts of water was added 279 parts of a 25 percent aqueous solution of dimethylamine. The mixture was agitated for 2 hours at room temperature (25 degrees) then at 80 to 90 degrees for 3 hours, cooled to room temperature and agitated for an additional 16 hours. The mixture was then filtered and washed with 400 parts of water to yield 440 parts of filter cake. To this filter cake were added 160 parts of water and 100 parts of dimethyl sulfate. The mixture, totaling 700 parts, was transferred to a cylindrical container and 100 parts of sand was added. The reaction mixture was agitated by rolling for several hours at room temperature (25 degrees), then by stirring for several hours at 25 to 35 degrees and then filtered to remove the sand. The reaction product was a dark blue solution of high fluidity containing about 20 weight percent of the dissolved dyestuff and having a viscosity of 35 centipoises at 25 degrees, as measured with a Brookfield Viscometer, Model LVF, using a No. 2 spindle at 60 revolutions per minute.

EXAMPLE 4

To 37 parts of water were added 25 parts of a 25 percent aqueous solution of trimethylamine and 14 parts of mixed bis, tris chloromethyl copper phthalocyanine (Cl=13.8 percent). The mixture was agitated for 30 minutes at 30 to 40 degrees. An additional 10 parts of the 25 percent aqueous solution of trimethylamine and 14 parts of the bis, tris chloromethyl copper phthalocyanine mixture were added and the temperature was increased to 45 to 50 degrees, maintained thereat for one hour and thereafter the resultant mixture was cooled to room temperature.

The reaction product

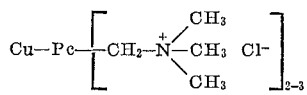

was a fluid, deep blue solution containing approximately 35 percent of dissolved copper phthalocyanine bis, tris (methylene trimethyl ammonium chloride). The viscosity of the solution (measured as in Example 3) was 17 centipoises at 25 degrees.

EXAMPLE 5

To 40 parts of water were added 3.6 parts of triethylamine and 6.7 parts of a mixture of bis and tris chloromethyl copper phthalocyanines, having an average of about 2.5 chloromethyl groups per molecule. Twenty parts of sand was added and the reaction mixture was mixed by rolling for about 16 hours in a cylindrical container. The sand was removed by filtration. The reaction product

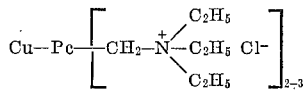

was only partially soluble in the aqueous medium and was solubilized by heating for 30 minutes on a steam bath. On cooling to room temperature the solution was a viscous, difficultly pourable dark blue liquid, containing about 20 percent of the dye copper phthalocyanine bis, tris (methylene triethyl ammonium chloride). The viscosity of the solution was 1400 centipoises at 25 degrees (measured with a Brookfield Viscometer using a No. 2 spindle at 12 revolutions per minute).

EXAMPLE 6

An aqueous solution of the dye:

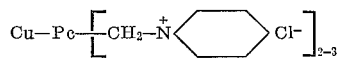

was prepared as follows: A mixture of 100 parts of dry pyridine and 10 parts of mixed bis, tris chloromethyl copper phthalocyanine (Cl=14.0 percent) was heated to reflux (about 114 degrees) for about 10 minutes, then cooled to room temperature (25 degrees). The reaction product was diluted with 80.7 parts of acetone, filtered, washed with acetone and dried. The resultant dried blue powder was mixed with water to form a 28 percent solution of the dye. The aqueous solution was a difficultly pourable mass having a viscosity (measured with a Brookfield Viscometer, Model LVF, using a No. 2 spindle at 6 revolutions per minute) of 3710 centipoises at 25 degrees.

EXAMPLE 7

Twenty parts of a commercially available dye prepared according to U.S. Pat. 3,320,275

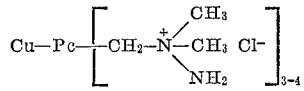

was dissolved in 80 parts of water by placing the mixture in a cylindrical container and rolling for about 16 hours. The viscosity of the resultant 20 percent aqueous solution was measured as in the preceding example, except that a No. 4 spindle was employed at 12 revolutions per minute. The viscosity was found to be 34,100 centipoises at 25 degrees.

An attempt to prepare a more concentrated aqueous solution (30 percent) of the same dye resulted in the formation of a non-pourable mass of tar-like consistency.

The unique and particularly advantageous solubility and viscosity characteristics of the concentrated aqueous solutions of the trimethyl ammonium salts of methylene copper phthalocyanine (Examples 1–4) is readily apparent from a comparison with the aqueous solutions of closely related compounds (Examples 5–7).

From the foregoing examples and description of my invention, it will be apparent that a new group of concentrated cellulose dyestuffs has been devised. It will be appreciated that the foregoing examples are illustrative and that many variations in the specific details set out therein can be employed without departing from the spirit of the invention.

I claim:

1. A composition suitable for dyeing paper comprising a concentrated, fluid, aqueous solution having a viscosity below about 100 centipoises at 25° C. containing between about 20 and 50 percent by weight of a dissolved dyestuff having the general formula

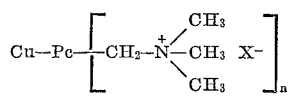

where Pc is phthalocyanine; $n$ is 2 to 8; and X is an anion selected from the group consisting of chloride, bromide and methyl sulfate.

2. The composition of claim 1 wherein X is chloride.
3. The composition of claim 2 wherein $n$ is 3 to 4.
4. The composition of claim 1 wherein X is bromide.
5. The composition of claim 4 wherein $n$ is 3 to 4.
6. The composition of claim 1 wherein X is methyl sulfate.
7. The composition of claim 6 wherein $n$ is 3 to 4.
8. The composition of claim 1 wherein said aqueous solution contains about 35 percent by weight of dissolved copper phthalocyanine-tris, tetrakis (methylene trimethyl ammonium chloride).
9. The composition of claim 1 wherein said aqueous solution contains about 20 percent by weight of dissolved copper phthalocyanine-tris, tetrakis (methylene trimethyl ammonium methyl sulfate).
10. The composition of claim 1 wherein said aqueous solution contains about 35 percent by weight of dissolved copper phthalocyanine-bis, tris (methylene trimethyl ammonium chloride).

References Cited

UNITED STATES PATENTS 3,346,322  10/1967  Finkenauer _____ 8—79

FOREIGN PATENTS

| 587,636 | 5/1947 | Great Britain | 260—314.5 |
| 633,160 | 12/1949 | Great Britain | 260—314.5 |
| 770,784 | 3/1957 | Great Britain | 260—314.5 |

OTHER REFERENCES

"Modern Plastics," pp. 417 and 423, vol. 42, No. 1A, September 1964, TP986AZM5.

DONALD LEVY, Primary Examiner

U.S. Cl. X.R.

8—79; 260—314.5